May 12, 1925.  1,537,261

C. T. PFLUEGER

ARTIFICIAL BAIT

Filed May 26, 1920

Inventor
Charles T. Pflueger
By Brockett & Hyde
Attorneys

Patented May 12, 1925.

1,537,261

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

ARTIFICIAL BAIT.

Application filed May 26, 1920. Serial No. 384,255.

*To all whom it may concern:*

Be it known that I, CHARLES T. PFLUEGER, a citizen of the United States, residing at Akron, in the county of Summit and State of Ohio, have invented certain new and useful Improvements in Artificial Bait, of which the following is a specification.

This invention relates to artificial bait and more especially to artificial minnows.

The object of the invention is to provide an improved minnow or artificial bait embodying a loosely mounted flipper or device adapted to swing or dart from side to side and up and down as the minnow travels through the water, which of itself is an excellent lure for fish, and which flipper or device may also be provided with a bright surface or appearance to additionally attract or lure fish by the resultant flashing or darting effects.

A further object of the invention is to provide such a flipper or device which can be readily applied to any artificial bait and which is cheap to manufacture.

Further objects of the invention are in part obvious and in part will appear more in detail hereinafter.

Figure 1:
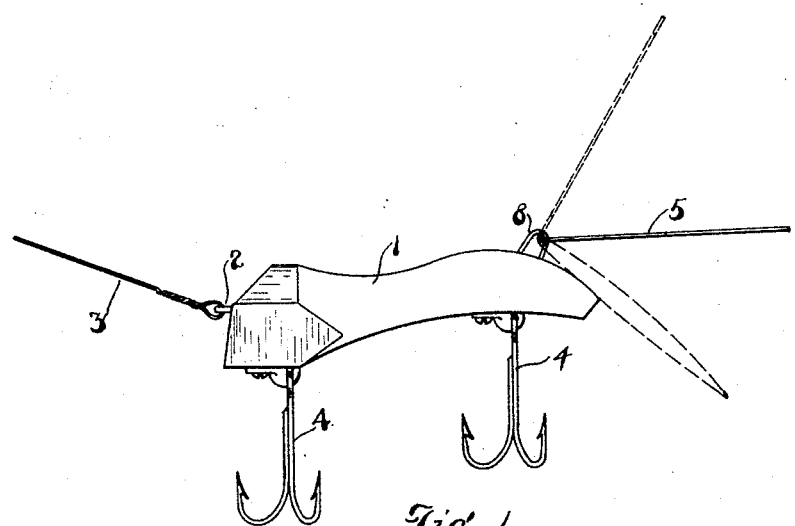
Figure 2:
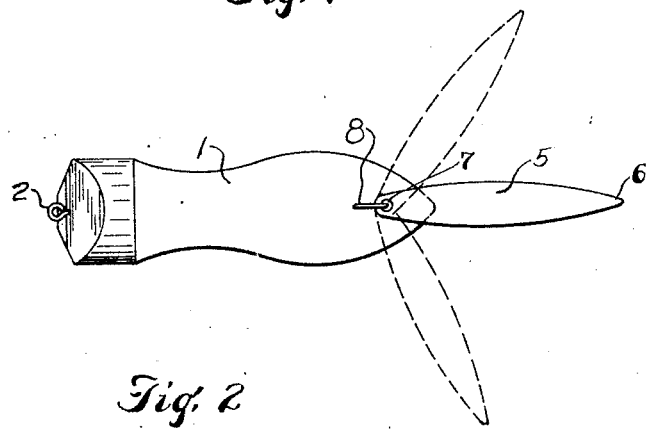

In the drawings, Fig. 1 represents a side elevation of one form of artificial bait embodying the invention; and Fig. 2 is a plan view thereof.

The invention may be applied with advantage to any form of artificial bait, but the best effects are obtained when it is applied to a minnow of the general form illustrated in a prior application for artificial bait, Serial No. 315,870, filed Aug. 7, 1919 by C. T. Pflueger and W. L. Adams, or in other words, to a minnow body constructed and arranged so that as said body travels along a path through the water the body wobbles or vibrates laterally from side to side giving the effect of a minnow travelling along a sinuous line of relatively short waves or arcs.

Briefly described this minnow includes a body portion 1 of any suitable form to produce the motion before described, such for example as described in said application, provided at one end with an eye 2 for attachment to the fishing line 3, and to the body of which minnow may be secured one or a plurality, two being shown, of hooks 4, the hooks illustrated being of the multiple variety.

Without detailed description of the essential characteristics of shape and form of the minnow body, which are clearly illustrated in the drawings and fully described in said prior application, it is sufficient for the present to state that the minnow body illustrated is so formed as to have a definite motion when drawn through the water. The pull on the line causes the body to travel in approximately a straight path but the curved and flat body surfaces also give the body a motion as though it is oscillated from side to side about a vertical axis through the front portion of the body, so that the effect is as though the entire body moved on a fairly regular sinuous path consisting of a series of waves of relatively short amplitude. While the rate of oscillation varies somewhat according to the speed at which the minnow is wound in, nevertheless it is always fairly rapid, due to the short waves of the sinuous effect. This peculiar but nevertheless fairly regular body motion appears to have a decided effect upon and contribute to the motion of the flipper because the latter on motion of travel of the minnow through the water seems to vibrate in step with the vibration of the minnow body. In other words, not only does the flipper by its mounting and shape have a vibrating effect but to its own motion is added that of the body. In the lateral or vibrating motion the flipper appears to lag behind the body. When the body is moving to the right the flipper is tardy but has similar motion, and when the body begins to swing to the left the flipper continues its motion to the right before it begins to partake of the body motion to the left. The net effect makes the flipper resemble the trailing vibrating tail of a natural minnow.

The flipper or lure forming the subject matter of this invention may be of any suitable form or shape to produce the desired effects. In the drawings, said flipper, indicated at 5, is a relatively long narrow thin strip, the edges of which converge toward its rear end to the point 6, so that in shape, generally speaking, it resembles a cigar and the forward end of which flipper is suitably formed for loose attachment to the minnow.

As illustrated, it is provided with a relatively large opening 7 through which is passed a staple or other securing device 8 for fastening it to the minnow.

This flipper may be made of any suitable material, so long as it is arranged to have the essential characteristics of loose mounting, whereby the effect of the movement of the minnow through the water is to cause the flipper by its loose mounting to whip back and forth. It may be made of rubber, fiber, composition material, wood or even pork rind, or similar materials. Usually I prefer to give the flipper a bright or attractive surface, an effect which can be secured by making it of shell or other bright materials, one material suitable for the purpose being nickel plated metal.

When the minnow moves through the water as a result of a pull on the fishing line, the flipper vibrates from side to side and up and down simulating the movement of a natural minnow or other living creature. If made of bright material or with a bright surface the darting and swinging movements also produce flashes and flickerings of light to lure the fish.

It will be further noted that the rear hook 4 is suspended beneath the body in advance of its rear end so that its shank can not rise above a horizontal position, while the flipper 5 is attached to the upper surface of the body materially above the rear hook. While the flipper has some up and down motion its oscillating or vibrating motion horizontally from side to side preponderates. As a consequence of the arrangement of hook and flipper the latter can vibrate freely above the hook without interference between the two.

What I claim is:

1. An artificial bait, comprising a body portion arranged for attachment to the line, and a relatively thin flat elongated trailing lure loosely connected at one end to said body portion for both lateral and up and down motion while maintaining its flat plane approximately horizontal.

2. An artificial bait, comprising a body arranged for attachment to the line, and a relatively thin elongated lure of approximately cigar shape loosely connected at one end to the upper surface of the rear portion of said body for both lateral and up and down motion.

3. An artificial bait, comprising a body arranged for attachment to the line, a relatively thin elongated lure of approximately cigar shape loosely connected at one end to said body for both lateral and up and down motion, the length of said lure being more than half the length of said body, and said lure extending rearwardly beyond said body for more than half of its own length.

4. A fish bait, comprising a bait body constructed and arranged so that as it travels along a path through the water the body wobbles or vibrates laterally along relatively short arcs from side to side of said path, and a cigar shaped elongated flat lure loosely attached to and normally trailing from the rear portion of the body so that the vibrating motion of the body causes similar motion of said flipper relative thereto.

5. A fish bait, comprising a bait body having a suspended hook attached to its lower surface and adapted to extend beyond the rear end of the body as the bait moves through the water, the parts being so arranged that rearward and upward swinging motion of the hook is limited by the engagement of its shank with the body, and an elongated flipper loosely connected to the upper surface of the rear portion of the body and extending rearwardly beyond the same and adapted to vibrate laterally above and out of range of said hook.

In testimony whereof I affix my signature.

CHARLES T. PFLUEGER.